(12) United States Patent
Daniel

(10) Patent No.: US 10,070,702 B2
(45) Date of Patent: Sep. 11, 2018

(54) QUICK-RELEASE SECURING DEVICE

(71) Applicant: James Marvin Daniel, Bolivia, NC (US)

(72) Inventor: James Marvin Daniel, Bolivia, NC (US)

(*) Notice: Subject to any disclaimer, the term of this patent is extended or adjusted under 35 U.S.C. 154(b) by 0 days.

(21) Appl. No.: 15/641,527

(22) Filed: Jul. 5, 2017

(65) Prior Publication Data

US 2018/0008008 A1    Jan. 11, 2018

Related U.S. Application Data

(60) Provisional application No. 62/358,656, filed on Jul. 6, 2016.

(51) Int. Cl.
| | |
|---|---|
| *A44B 13/02* | (2006.01) |
| *A44B 11/04* | (2006.01) |
| *A01K 27/00* | (2006.01) |
| *F16M 13/02* | (2006.01) |
| *B63B 59/00* | (2006.01) |

(52) U.S. Cl.
CPC ............ *A44B 13/02* (2013.01); *A01K 27/003* (2013.01); *A01K 27/005* (2013.01); *A44B 11/04* (2013.01); *B63B 59/00* (2013.01); *F16M 13/02* (2013.01); *A44D 2200/10* (2013.01)

(58) Field of Classification Search
CPC ....... A44B 13/02; A44B 11/04; A01K 27/003; A01K 27/005; F16M 13/02; A44D 2200/10; B63B 59/00
See application file for complete search history.

(56) References Cited

U.S. PATENT DOCUMENTS

| | | | | |
|---|---|---|---|---|
| 4,638,764 A * | 1/1987 | Anderson | ............ | A01K 27/00 119/770 |
| 4,827,876 A * | 5/1989 | Krekelberg | ............ | A01K 1/04 119/771 |
| 4,879,972 A * | 11/1989 | Crowe | ................ | A01K 27/003 119/792 |
| 5,005,527 A * | 4/1991 | Hatfield | ............... | A01K 27/005 119/793 |
| 5,038,719 A * | 8/1991 | McDonough | .......... | A01K 27/00 119/772 |
| D381,473 S * | 7/1997 | Dixon | .......................... | D30/144 |
| 5,666,909 A * | 9/1997 | Dupre | ................. | A01K 27/003 119/797 |
| 5,718,189 A * | 2/1998 | Blake | ..................... | A01K 27/00 119/770 |
| 6,016,772 A * | 1/2000 | Noyes | .................. | A01K 5/0114 119/61.56 |
| 6,029,611 A * | 2/2000 | Hershauer | ............ | A01K 1/0272 119/771 |
| 6,047,665 A * | 4/2000 | Deveaux | .............. | A01K 27/003 119/770 |

(Continued)

*Primary Examiner* — David M Upchurch
(74) *Attorney, Agent, or Firm* — Carla Gannon Law

(57) ABSTRACT

A quick-release securing device is constructed of nylon strap having an openable loop at one end, and snap hook at the other end. The distance between the openable loop and the snap hook, and the circumference of the openable loop, is adjustable. The loop can be opened and closed using a buckle. A supplemental strap may be employed for releasably attaching items, such as boat fenders, to the securing device.

11 Claims, 7 Drawing Sheets

(56) References Cited

U.S. PATENT DOCUMENTS

| | | | | |
|---|---|---|---|---|
| 6,161,505 A * | 12/2000 | Noguero | A01K 27/002 | 119/792 |
| 6,311,884 B1 * | 11/2001 | Johnson | A45F 3/04 | 224/153 |
| 6,626,132 B1 * | 9/2003 | Mann | A01K 27/003 | 119/769 |
| 6,662,753 B1 * | 12/2003 | Sporn | A01K 27/003 | 119/797 |
| 6,971,334 B1 * | 12/2005 | Livesay | A01K 27/003 | 119/792 |
| 7,243,615 B1 * | 7/2007 | Hendrie | A01K 27/001 | 119/792 |
| 7,387,087 B2 * | 6/2008 | Lady | A01K 27/002 | 119/792 |
| D669,233 S * | 10/2012 | Ranstead | D30/153 | |
| 8,365,685 B2 * | 2/2013 | Simons | A01K 1/0613 | 119/756 |
| D699,406 S * | 2/2014 | Stolte | D30/153 | |
| 9,775,328 B1 * | 10/2017 | Fidrych | A01K 27/001 | |
| 2003/0093884 A1 * | 5/2003 | Doty | B60P 3/079 | 24/302 |
| 2004/0237264 A1 * | 12/2004 | Shaw | B60P 7/0823 | 24/68 R |
| 2006/0042562 A1 * | 3/2006 | Wagner | A01K 27/001 | 119/792 |
| 2006/0130776 A1 * | 6/2006 | Fountoulakis | A01K 27/00 | 119/792 |
| 2007/0157892 A1 * | 7/2007 | Farrell | A01K 27/003 | 119/795 |
| 2008/0000486 A1 * | 1/2008 | Wilson | A61G 1/044 | 128/898 |
| 2013/0228140 A1 * | 9/2013 | Stein | A01K 27/003 | 119/770 |
| 2014/0259551 A1 * | 9/2014 | Egbert | A45F 3/14 | 24/302 |
| 2015/0053145 A1 * | 2/2015 | Miksovsky | A01K 27/003 | 119/772 |
| 2015/0136825 A1 * | 5/2015 | Kalck | A63B 55/008 | 224/653 |
| 2016/0183666 A1 * | 6/2016 | Whitehill | A45F 3/02 | 224/578 |

* cited by examiner

QUICK-RELEASE SECURING DEVICE

CROSS-REFERENCE TO RELATED APPLICATIONS

This application claims the benefit of U.S. Provisional Application 62/358,656, entitled QUICK-RELEASE SECURING DEVICE, filed on Jul. 6, 2016, which is hereby incorporated by reference in its entirety.

BACKGROUND OF THE INVENTION

Field

The present invention relates to securing hardware, and more specifically, to an adjustable strap system for securing boat fenders.

Related Art

Many boaters carry fenders on their boats, which are used to protect the hull from damage if the boat rocks back and forth while docked. These fenders are typically secured to a boat by a rope fender line that is tied to the fender at one end and tied to a line, rail or other hardware mounted on a boat at the other end. Conventionally, one will adjust the length of the fender line when tying the rope at the boat end in order to raise and lower the fender and secure it over the side of the boat at the proper point of contact for mooring.

Oftentimes a boater will have to untie, adjust and retie a rope to a boat several times before the fender will hang at the proper height and be tightly secured in position.

Unfortunately, knots in the rope are sometimes difficult to untie, and determining the proper knot placement and retying the rope while the boat is in the water can be challenging, so the boater may waste valuable time making these adjustments while trying to dock their boat. Additionally, if the boater does not tie a secure knot, there is risk of the rope detaching and the fender being lost.

As can be seen, there is a need for an efficient device for quickly and easily securing fenders in the proper position on a boat. It is preferred that this device is simple, adjustable, easy to use, and inexpensive to manufacture and transport.

SUMMARY OF THE INVENTION

A quick-release securing device of the present invention is constructed of nylon strap having an openable loop at one end, and snap hook at the other end. The distance between the openable loop and the snap hook, and the circumference of the openable loop, is adjustable. The loop can be opened and closed using a buckle. A supplemental strap may be employed for releasably attaching items, such as boat fenders, to the securing device.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:

10—securing device;
15—primary strap;
17—secondary strap;
19—interface;
20—openable loop;
25—buckle;
26—supplemental securing device;
27—D-ring;
28—closed loop;
   28($a$)(1)—primary proximal closed loop;
   28($b$)(1)—primary distal closed loop;
   28($a$)(2)—secondary proximal closed loop;
   28($b$)(2)—secondary distal closed loop;
30—snap hook;
35—fender;
40—slider;
   40($a$)—proximal slider;
   40($b$)—distal slider;
50—supplemental securing belt; and
60—alternative embodiment.

Figure 1:
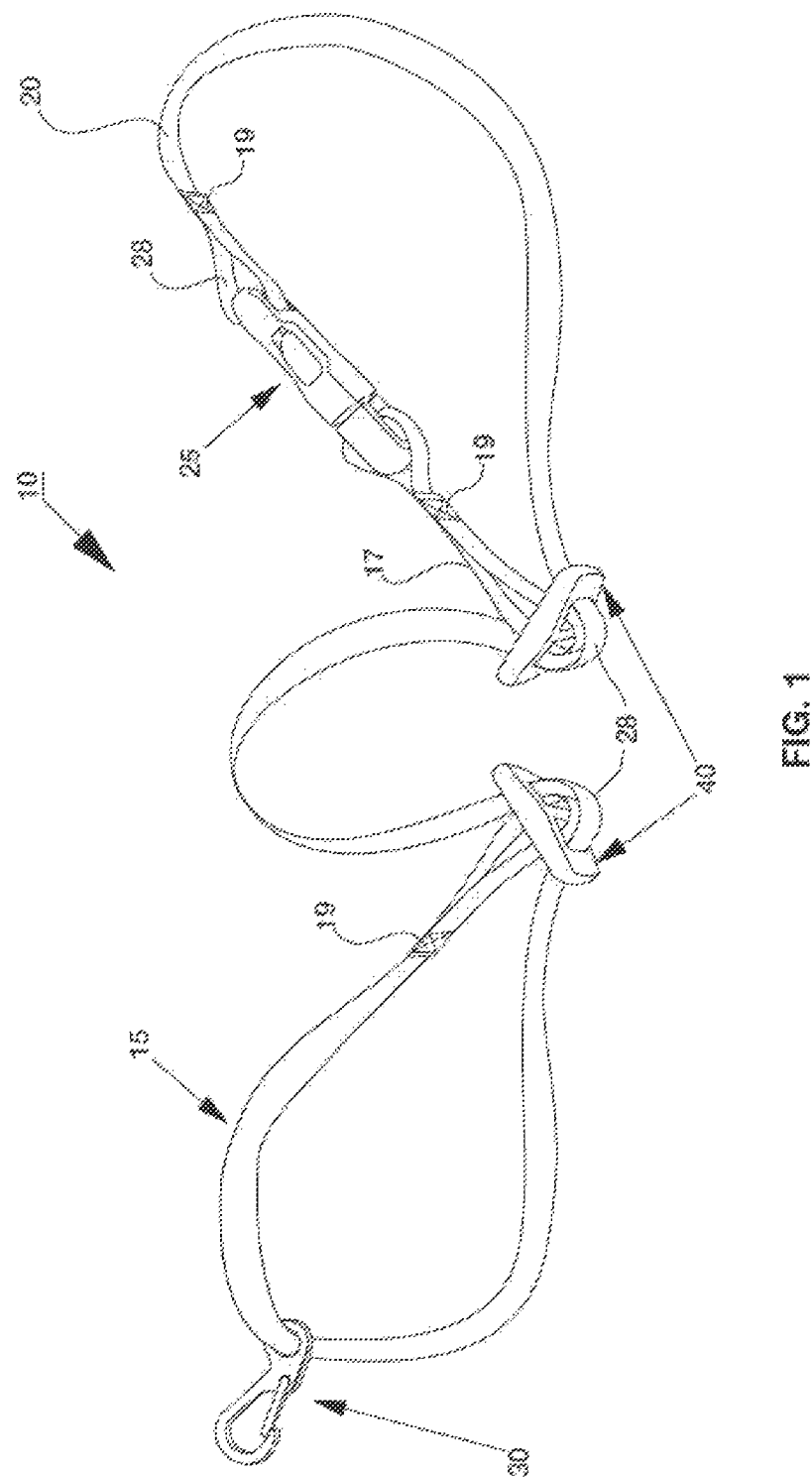
FIG. 1 depicts a securing device.
Figure 5:
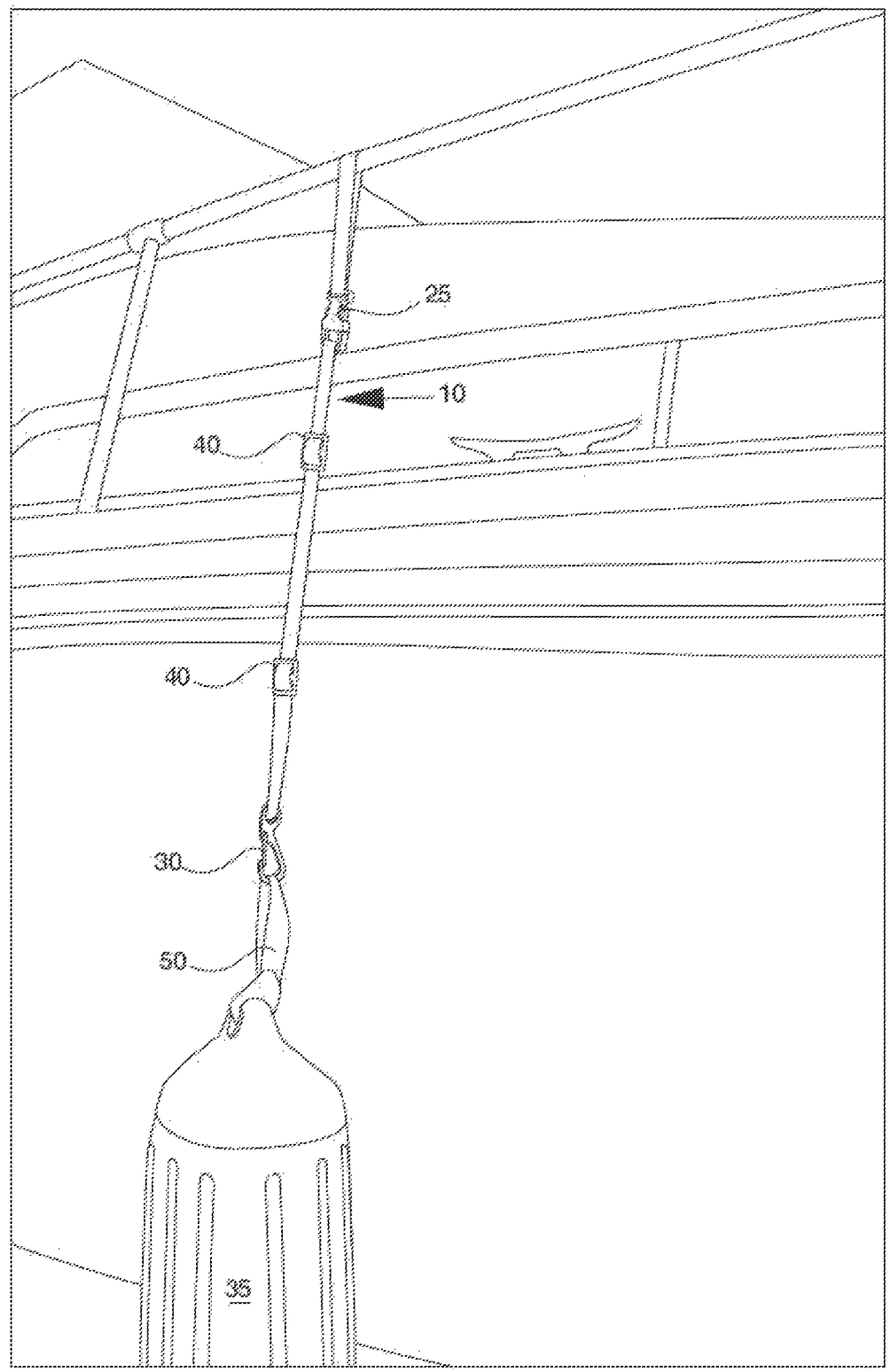
FIG. 5 depicts side of a boat with a securing device hanging from the boat rail and suspending a supplemental strap attached to the top portion of a boat fender.
Figure 7:
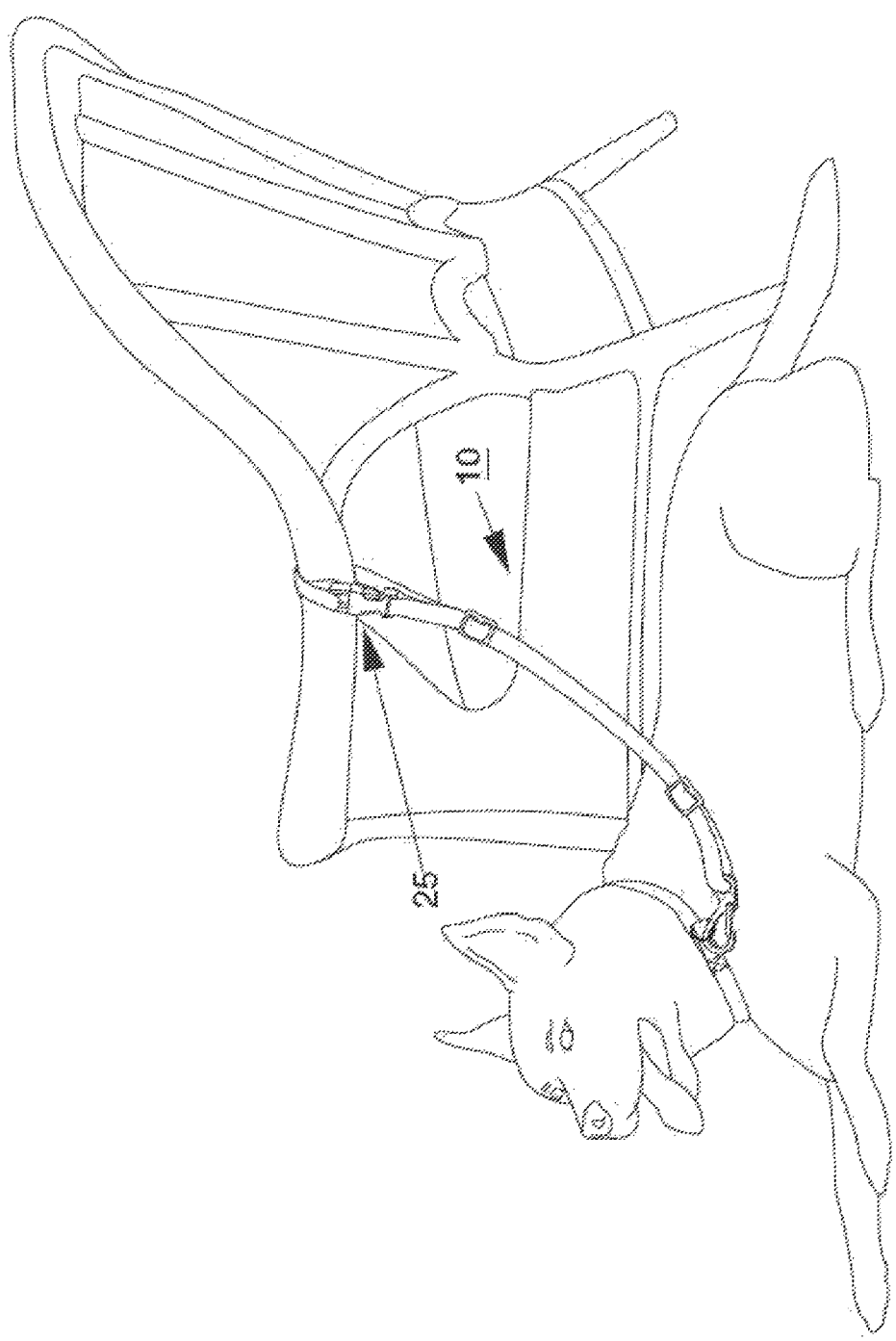
FIG. 7 depicts a securing device restraining a dog.

Referring to FIG. 1, securing device 10 is constructed of primary strap 15, with openable loop 20 at the proximal side, and snap hook 30 at the distal side. As used herein "proximal side" and "distal side" identify regions or ends of the device when the device is stretched out, for example when a device is suspending an item. Openable loop 20 is opened and closed with buckle 25 having two mating sides, thereby allowing device 10 to be attached to a variety of objects by encircling them, for example a boat rail as shown in FIG. 5, or the arm of a chair as shown in FIG. 7. The length of the device can be adjusted using distal slider 28. The circumference of the openable loop can be adjusted using proximal slider 40. Using either slider will adjust the overall length of the securing device because increasing/decreasing the circumference of the openable loop likewise increases/decreases the distance between the proximal side and distal side of device. Primary strap 15 is one continuous strap segment terminating in two closed loops 28, preferably formed by stitching strap portions together at interface 19. Interface 19 is preferably substantially permanent such that separating is possible but would be difficult and/or is likely to damage straps. Closed loops 28 of primary strap 15 are located at proximal slider 28 and at buckle 25. Secondary strap connects distal slider 28 to other end of buckle 25.

Figure 2:
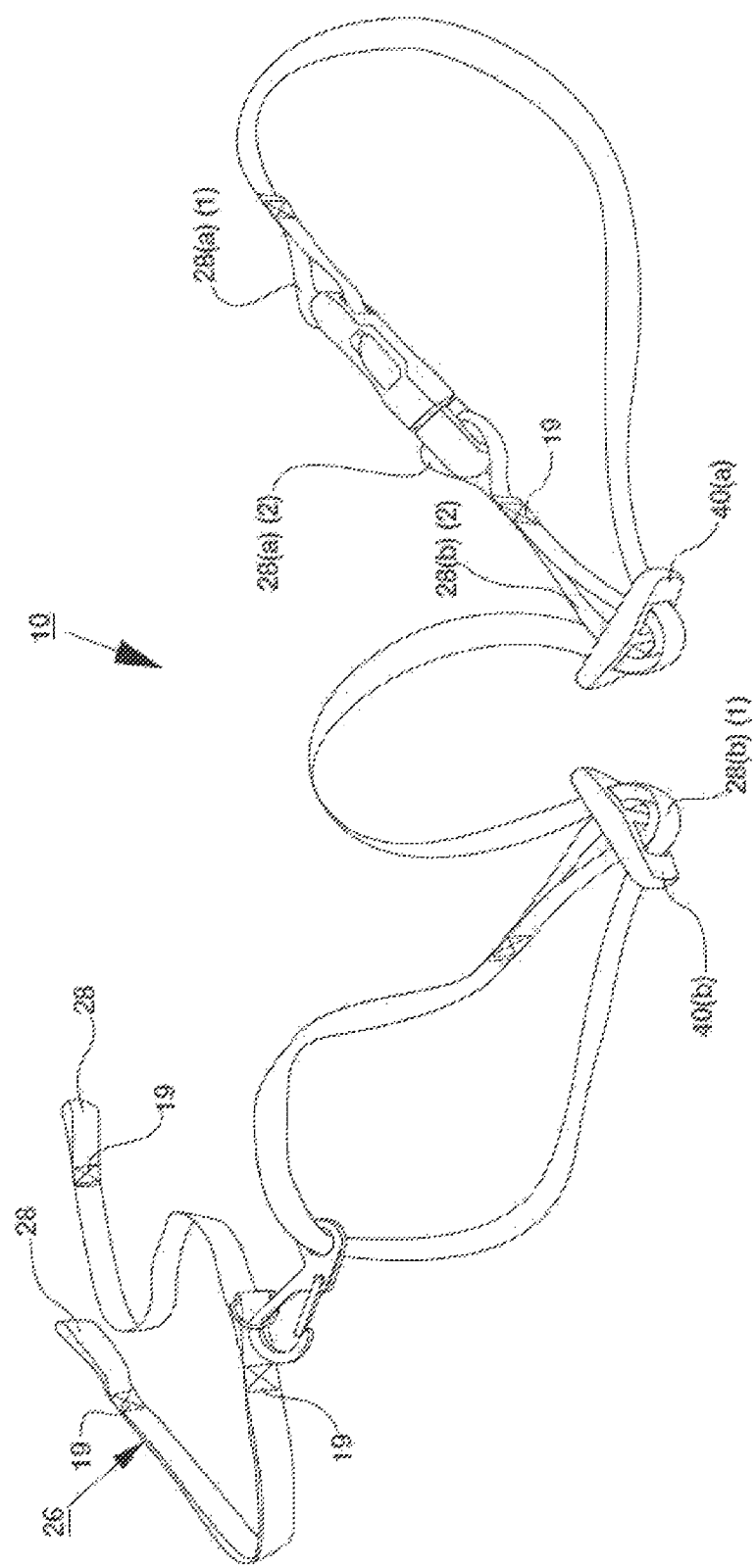
FIG. 2 depicts a securing device, with a supplemental securing device attached.
Figure 6:
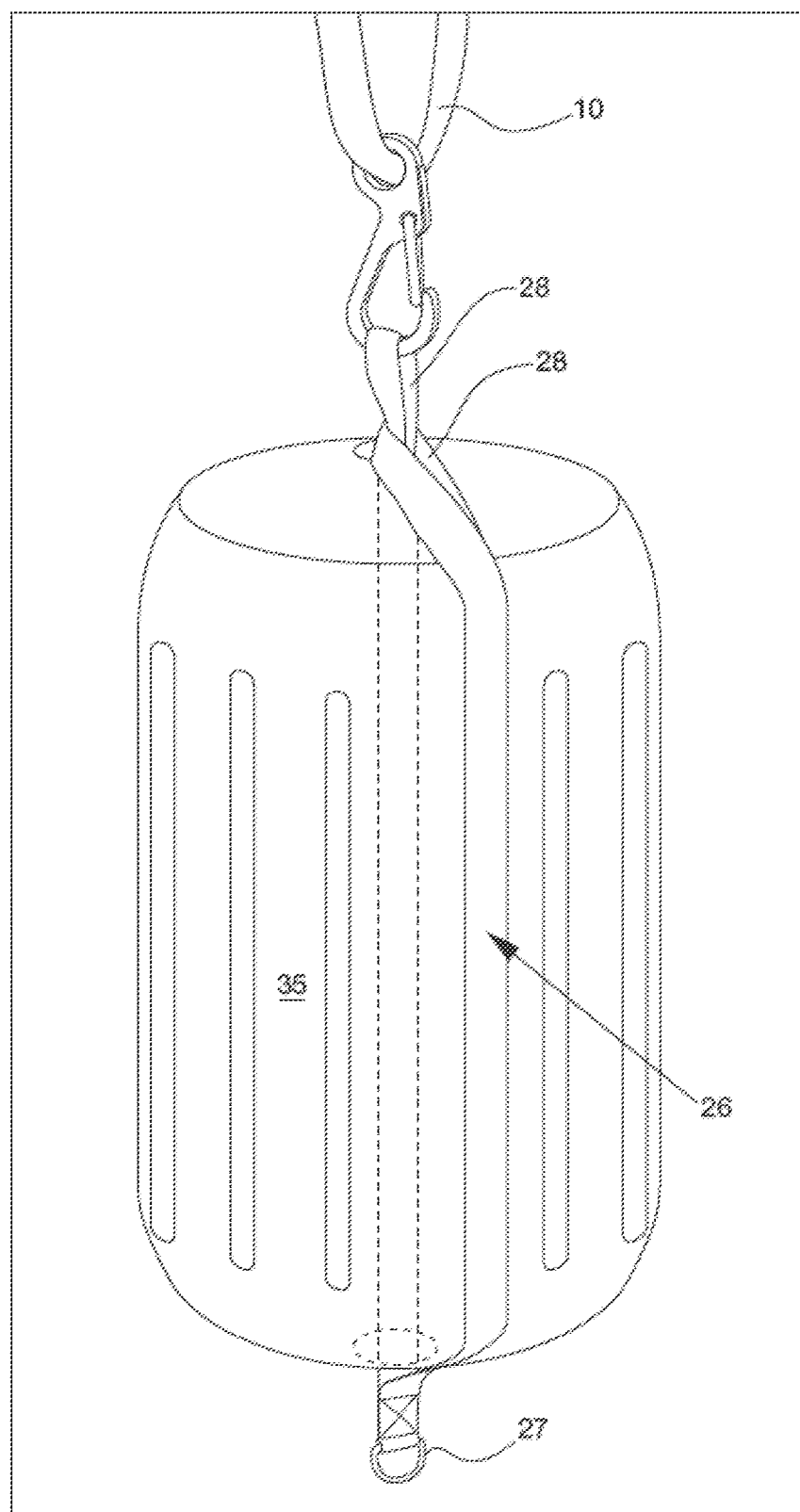
FIG. 6 depicts the snap hook end of a securing device suspending a supplemental securing device attached to a boat fender.

FIG. 2 depicts securing device 10 with supplemental strap 26 attached thereto. Ends of supplemental strap terminate in closed loops 28, and approximately equidistant between the two closed loops 29 is D-ring 27. As shown in FIG. 6, supplemental strap 26 is particularly well suited for threading through boat fender 35 which has a longitudinal channel there through. Supplemental strap 26 can be "looped back through itself" so the protruding loop provides an attachment site for snap hook 30 of securing device. D-ring 27 protruding from bottom of fender 35 can also provide attachment site for snap hook 30 of securing device, particularly where horizontal orientation of fender 35 is desired by employing two securing devices.

Figure 3:
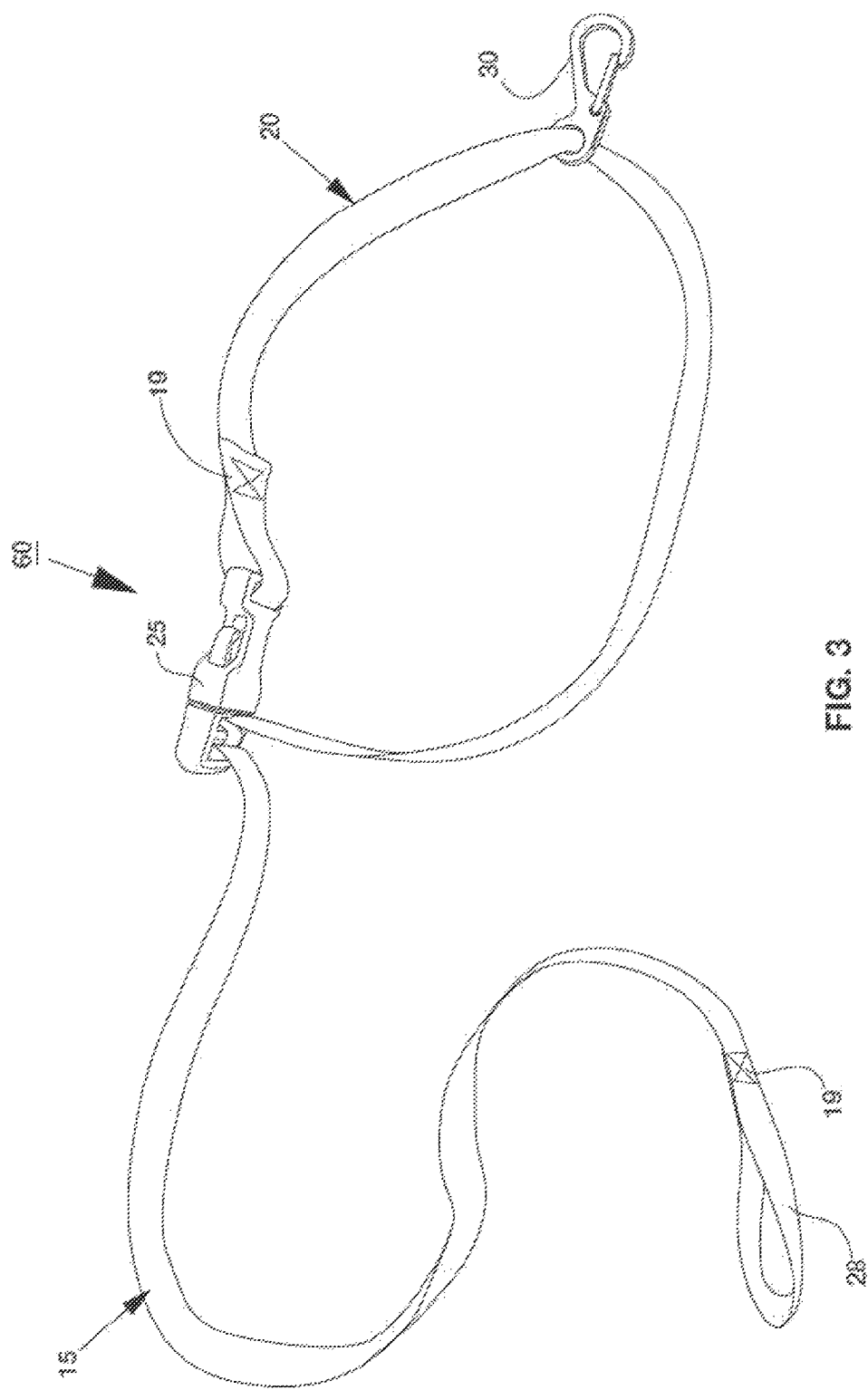
FIG. 3 depicts an alternative securing device.

Alternative embodiment 60 is shown in FIG. 3, and differs from securing device 10 insofar as snap hook 30 is engaged with openable loop 20; there are no sliders 40; there is no secondary strap 17; and distal side terminates in closed loop 28. End-to-end length of alternative embodiment 60 and circumference of openable loop is varied by adjusting length of primary strap 15 through buckle 25.

Figure 4:
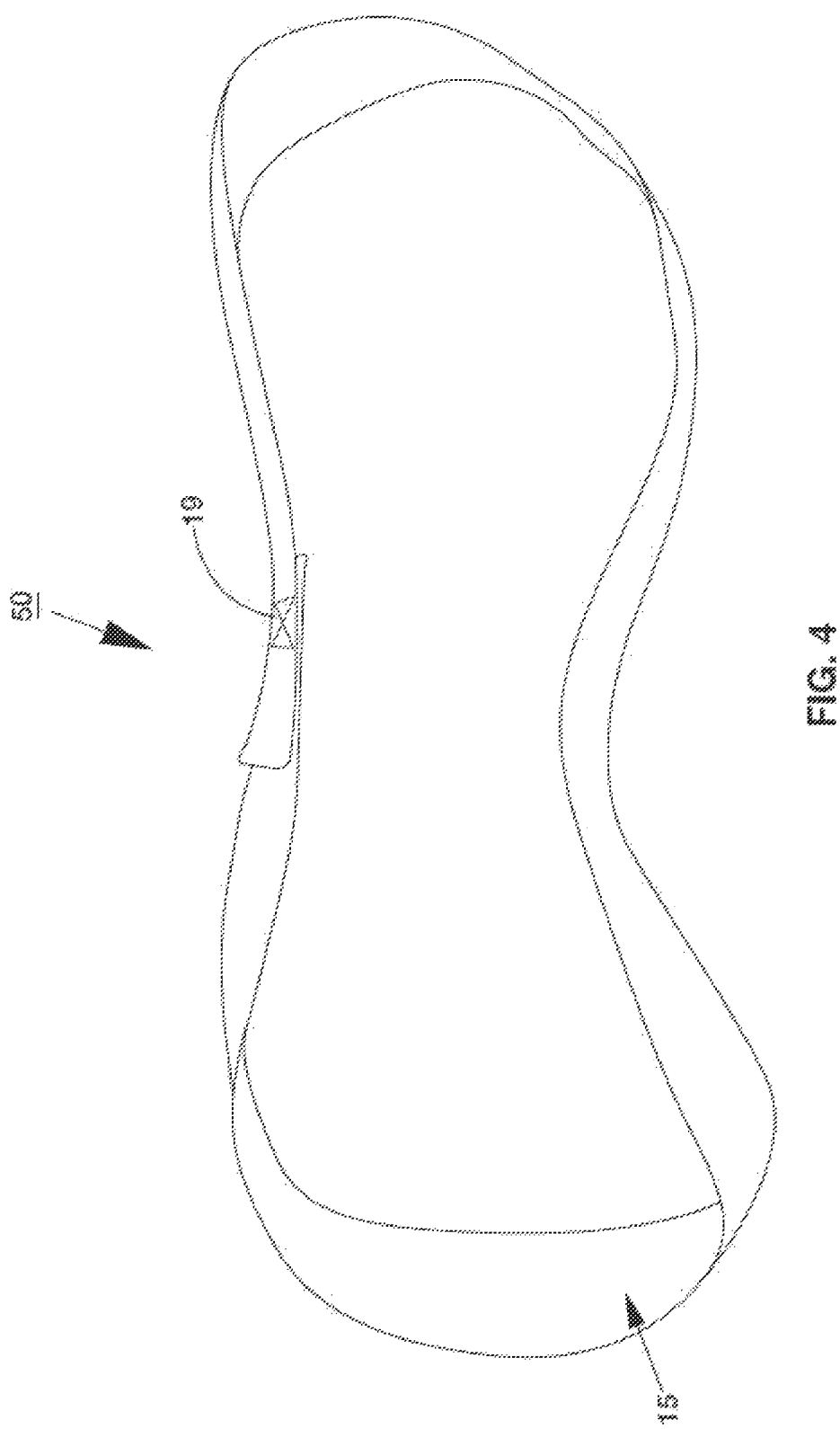
FIG. 4 depicts a supplemental securing belt.

Supplemental securing belt 50 of FIG. 4 includes a section of primary strap with terminal side secured at interface 19. As shown in FIG. 5, supplemental securing belt can be "looped back through itself" to provide a protruding loop which serves as an attachment site for snap hook 30 of securing device 10.

The length of securing device 10 is preferably 8"-24"; 24"-36"; or 35"-72", with the first length indicating the length of the device in the completely shortened state, and the second length indicating the length of the device in the completely extended state, as adjusted by sliders 40. Length of alternative embodiment 60 is preferably 16"-24" in the shortened to lengthened state, respectively.

Primary strap 15 is preferably 1" nylon flat webbing, having a breaking strength of >4,300 pounds, which is commercially available from a variety of sources including Tapecraft Corporation of Oxford, Ala. Snap hook 30 is commercially available from a variety of sources including Prime Industries, Inc. of Virginia Beach, Va. Snap hook is preferably stainless steel. Slider 40 is preferably a tri-glide, which is commercially available from a variety of sources including American Cord and Webbing Inc. of Woonsocket, R.I. Buckle 25 is preferably a Side Release Buckle which is commercially available from a variety of sources including John C. Tucker Co., Inc. of Fort Worth, Tex. It is preferred to use marine grade materials in constructing the device. The breaking strength of the securing device is approximately 200-225 pounds.

Supplemental strap 26 is preferably constructed of the same flat webbing as primary strap 15. D-ring 27 is preferably stainless steel D-ring for 1" strap which is commercially available from a variety of sources including Prime Industries, Inc. of Virginia Beach, Va.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. Rather, it should be understood that all specifications, unless otherwise stated or contrary to common sense, are +/−10%. It should also be understood that ranges of values set forth inherently include those values, as well as all increments between.

What is claimed is:

1. A securing device including:
    a) A primary strap terminating in a primary proximal closed loop and a primary distal closed loop;
    b) A buckle substantially engaged with said primary proximal closed loop;
    c) A distal slider engaged with said primary distal closed loop;
    d) A secondary strap terminating in a secondary proximal closed loop and a secondary distal closed loop, said secondary proximal closed loop engaged with said buckle;
    e) A proximal slider engage with said secondary distal closed loop; and
    f) snap hook engaged with said primary strap, wherein said primary strap and said secondary strap form an openable loop sharing said buckle.

2. The securing device of claim 1 wherein said primary strap is slidably engaged with said proximal slider.

3. The securing device of claim 2 wherein said primary strap is slidably engaged with said distal slider.

4. The securing device of claim 1 wherein a monolayer of primary strap spans said proximal slider to said distal slider.

5. The securing device of claim 1 wherein said primary proximal closed loop and said primary distal closed loop include stitches.

6. The securing device of claim 5 wherein said secondary proximal closed loop and said secondary distal closed loop include stitches.

7. A securing system including:
    a) A securing strap including:
        i) A primary strap terminating in a primary proximal closed loop and a primary distal closed loop;
        ii) A buckle substantially engaged with said primary proximal closed loop;
        iii) A distal slider engaged with said primary distal closed loop;
        iv) A secondary strap terminating in a secondary proximal closed loop and a secondary distal closed loop, said secondary proximal closed loop engaged with said buckle;
        v) A proximal slider engage with said secondary distal closed loop; and
        vi) A snap hook engaged with said primary strap, wherein said primary strap and said secondary strap form an openable loop sharing said buckle; and
    b) A supplemental securing device having closed loops at both terminal ends and including a D-ring engaged with said snap hook.

8. The securing system of claim 7 wherein said buckle is constructed of two mating segments.

9. The securing system of claim 7 wherein said proximal slider is for adjusting the length of said openable loop.

10. The securing system of claim 9 wherein said securing system includes exactly two sliders.

11. The securing system of claim 7 wherein said D-ring is approximately equidistant between said closed loops.

* * * * *